United States Patent [19]
Lyon

[11] Patent Number: 5,930,898
[45] Date of Patent: Aug. 3, 1999

[54] LINEAR MOTION BEARING FABRICATION

[75] Inventor: Gregory Lyon, Mamaroneck, N.Y.

[73] Assignee: Thomson Industries, Inc., Port Washington, N.Y.

[21] Appl. No.: 08/896,362

[22] Filed: Jul. 18, 1997

Related U.S. Application Data

[63] Continuation of application No. 08/546,016, Oct. 20, 1995, abandoned.

[51] Int. Cl.$^6$ ...................................................... B23P 15/00
[52] U.S. Cl. ................................ 29/898.03; 29/898.066; 29/509; 29/514; 29/451; 381/55
[58] Field of Search .................................. 384/55, 45, 43; 29/898.03, 509, 514, 451, 453, 450, 898.063, 898.066

[56] References Cited

U.S. PATENT DOCUMENTS

| | | | |
|---|---|---|---|
| 1,998,791 | 4/1935 | Schanz | 29/451 |
| 2,411,488 | 11/1946 | White | 29/451 |
| 3,046,805 | 7/1962 | Gorp | 29/451 |
| 3,456,471 | 7/1969 | Ellis | 29/897.35 |
| 3,605,231 | 9/1971 | Kistuer et al. | 29/451 |
| 3,670,399 | 6/1972 | George | 29/509 |
| 3,685,116 | 8/1972 | Neuman et al. | |
| 3,722,052 | 3/1973 | Toti | 29/509 |
| 3,900,233 | 8/1975 | Thomson | |
| 3,992,769 | 11/1976 | Jackson | 29/451 |
| 4,025,955 | 5/1977 | Grallien et al. | |
| 4,025,995 | 5/1977 | Thomson | |
| 4,515,413 | 5/1985 | Teramachi | |
| 4,527,841 | 7/1985 | Teramachi | |
| 4,531,788 | 7/1985 | Teramachi | |
| 4,554,718 | 11/1985 | Ollinger et al. | 29/514 |
| 4,576,420 | 3/1986 | Lehmann et al. | |
| 4,576,421 | 3/1986 | Teramachi | |
| 4,774,247 | 9/1988 | Shiokawa et al. | |
| 4,869,600 | 9/1989 | Tonogai | |
| 4,932,067 | 6/1990 | Pester et al. | |
| 4,983,049 | 1/1991 | Lecomte | |
| 5,059,037 | 10/1991 | Albert | |
| 5,067,823 | 11/1991 | Kasuga | |
| 5,161,896 | 11/1992 | Hofling et al. | |
| 5,176,454 | 1/1993 | Schlereth | |
| 5,217,308 | 6/1993 | Schroeder | |
| 5,363,628 | 11/1994 | Basar et al. | 29/450 |

FOREIGN PATENT DOCUMENTS

| | | |
|---|---|---|
| 0353396 | 2/1990 | European Pat. Off. |
| 3504061 | 8/1986 | Germany |
| 4118479 | 1/1992 | Germany |
| 4102147 | 7/1992 | Germany |
| 4313074 | 10/1994 | Germany |
| WO92/12353 | 7/1992 | WIPO |

OTHER PUBLICATIONS

Patent Abstracts of Japan, vol. 11, No. 1 (M–550), Jan. 6, 1987 & JP, A, 61 180018 (Matsushita), Aug. 12, 1986.

*Primary Examiner*—S. Thomas Hughes
*Assistant Examiner*—Marc W. Butler
*Attorney, Agent, or Firm*—Dilworth & Barrese

[57] ABSTRACT

A method of forming a rail having an elongate base member and a load bearing insert is disclosed. The method includes forming a base member having surfaces with at least one longitudinal groove and inserting the load bearing insert into the longitudinal groove. Inserting of the load bearing insert may be performed by flexing the load bearing insert to fit into the longitudinal groove. The surfaces of the base member adjacent the longitudinal groove may be subsequently crimped to secure the load bearing insert.

13 Claims, 5 Drawing Sheets

Fig. 4
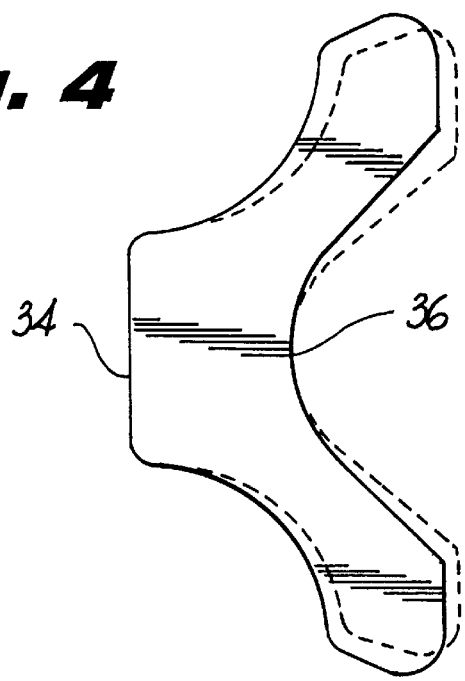
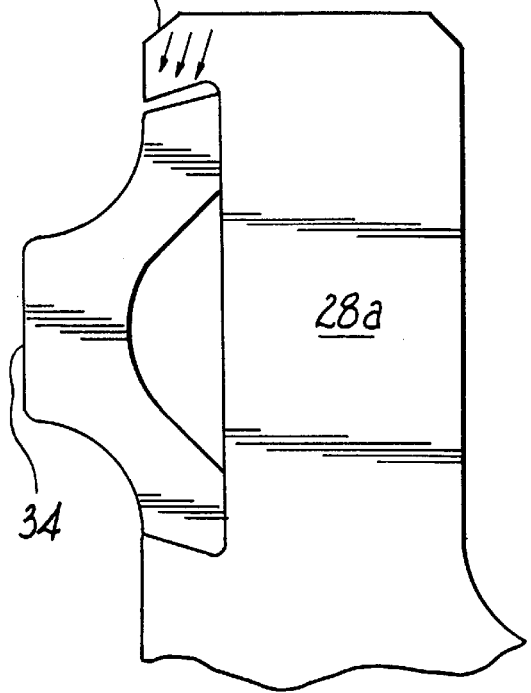
Fig. 5
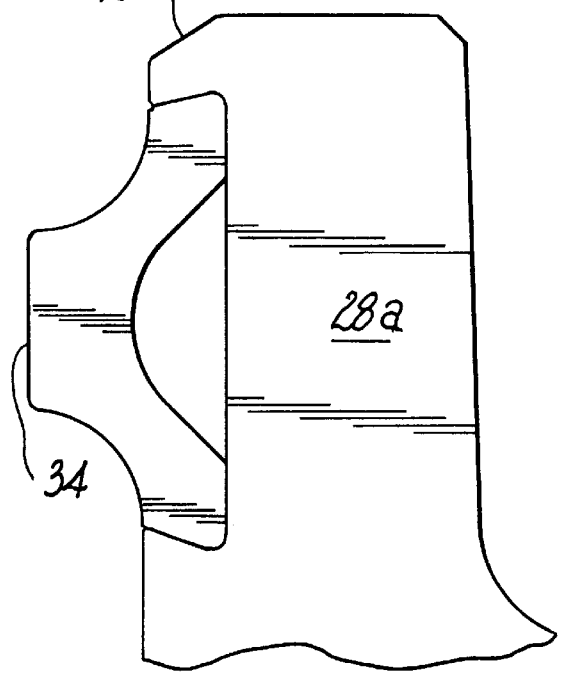
Fig. 6

LINEAR MOTION BEARING FABRICATION

This is a continuation of application Ser. No. 08/546,016 filed on Oct. 20, 1995 abandoned Sep. 27, 1997.

BACKGROUND OF THE INVENTION

1. Field of the Invention

The present invention relates to a low cost manufacturing technique to produce composite linear motion bearing structures. More particularly, this method of manufacturing greatly simplifies the fabrication of the bearing rail while facilitating efficient and inexpensive production.

2. Description of Related Art

Linear motion bearing assemblies are well known in the art and are employed to move machine and machine tools and other equipment with respect to each other. These bearing assemblies typically include rail and carriage structures, rolling elements, and provisions for recirculation and lubrication. See, for example, U.S. Pat. No. 4,932,067 to Pester et al. Typically, these bearings are manufactured from monolithic structures comprised of high quality bearing steels. The sequence of manufacture of the rail and carriage for this type of bearing assemblies is typically, cold drawing, machining, heat treating and grinding. The processing is generally performed on elaborate and expensive machining equipment, leading to substantial cost. In addition, one characteristic of high quality bearing steel is its rigidity. This characteristic results in a requirement for extreme precision in grinding the load bearing tracks and highly accurate installation of the linear motion bearing assembly to avoid overly stressing the contact portions.

Attempts have been made in the past to reduce the amount of bearing steel that requires processing by applying the high quality bearing steel only in the contact areas. See, for example, U.S. Pat. Nos. 3,900,233 and 4,025,955 to Thompson and U.S. Pat. Nos. 4,515,413, 4,527,841, 4,531,788 and 4,576,421 to Teramachi. A variety of techniques are provided for attaching the bearing steel insert to the supporting body. The techniques include press fitting, mating of dove tails, cold forming of the bearing steel insert and cold forming of the support structure.

Attempts have also been made in the past to improve positioning of the bearing steel in the supporting body. For example, U.S. Pat. No. 4,576,420 to Lehman, discloses utilization of the preload of the rolling elements to position the bearing steel in the carriage. U.S. Pat. No. 4,774,247 to Isert discloses usage of integral clamping force afforded by the support structure to hold the bearing steel. U.S. Pat. No. 5,067,823 to Kasuga discloses a plastically deforming process of the support structure through roll forming. U.S. Pat. No. 5,059,037 to Albert and U.S. Pat. No. 5,161,896 to Hofling disclose floating of the bearing steel insert until it is positioned by the reaction of the rolling element. U.S. Pat. No. 5,217,308 to Schroeder discloses attachment of the bearing steel by mating surfaces or thorough press fit.

Therefore, it would be highly desirable to eliminate or reduce the expensive materials and the requirements of each of these manufacturing steps. At the very least, it would be desirable to emphasize the inexpensive materials and steps and de-emphasize the expensive materials and steps.

Accordingly, it is an object of the present invention to provide an efficient and simplified manufacturing process which minimizes the cost related to fabrication of the bearing rail and attachment of the bearing steel insert while providing the capability of optimizing the quality of manufactured linear motion bearing assembly.

Objects and advantages of the invention are set forth in part herein and in part will be obvious therefrom, or may be learned by practice with the invention, which is realized and attained by means of the instrumentalities and combinations pointed out in the appended claims. The invention consists of novel parts, constructions, arrangements, combinations, steps and improvements herein shown and described.

SUMMARY OF THE INVENTION

In accordance with the present invention, a method is provided herein for producing a rail for use in a linear motion bearing assembly. The method includes the steps of forming a base member of the rail having at least one longitudinal groove and inserting a load bearing insert into the longitudinal groove. The load bearing insert may include parallel grooves to form load bearing tracks. This method simplifies manufacture of the rail and avoids need for difficult and expensive grinding and hardening of the load bearing tracks directly on the rail.

Further, the method may include the steps of undercutting surfaces of the base member to define the longitudinal groove, flexing the load bearing insert to fit into the longitudinal groove and crimping a portion of the base member to secure the load bearing insert. The load bearing insert may be cold drawn to include the load bearing tracks thereon. The base member may be extruded to include a pair of substantially vertical arms with the longitudinal grooves therein.

This method provides an inexpensive and efficient fabrication, assembly and installation of the rail for use in a linear motion bearing assembly.

BRIEF DESCRIPTION OF THE DRAWINGS

The accompanying drawings, referred to herein and constituting a part hereof, illustrate the preferred embodiments of the apparatus of the present invention, and, together with the description, serve to explain the principles of the invention.

FIG. 4 is an end view of a load bearing insert of the rail of FIG. 1.

FIG. 5 is an end view of the load bearing insert and a base member of the rail of FIG. 1 before being crimped.

FIG. 6 is an end view of the load bearing insert and the base member of the rail of FIG. 1 after being crimped.

DETAILED DESCRIPTION OF PREFERRED EMBODIMENTS

Figure 1:
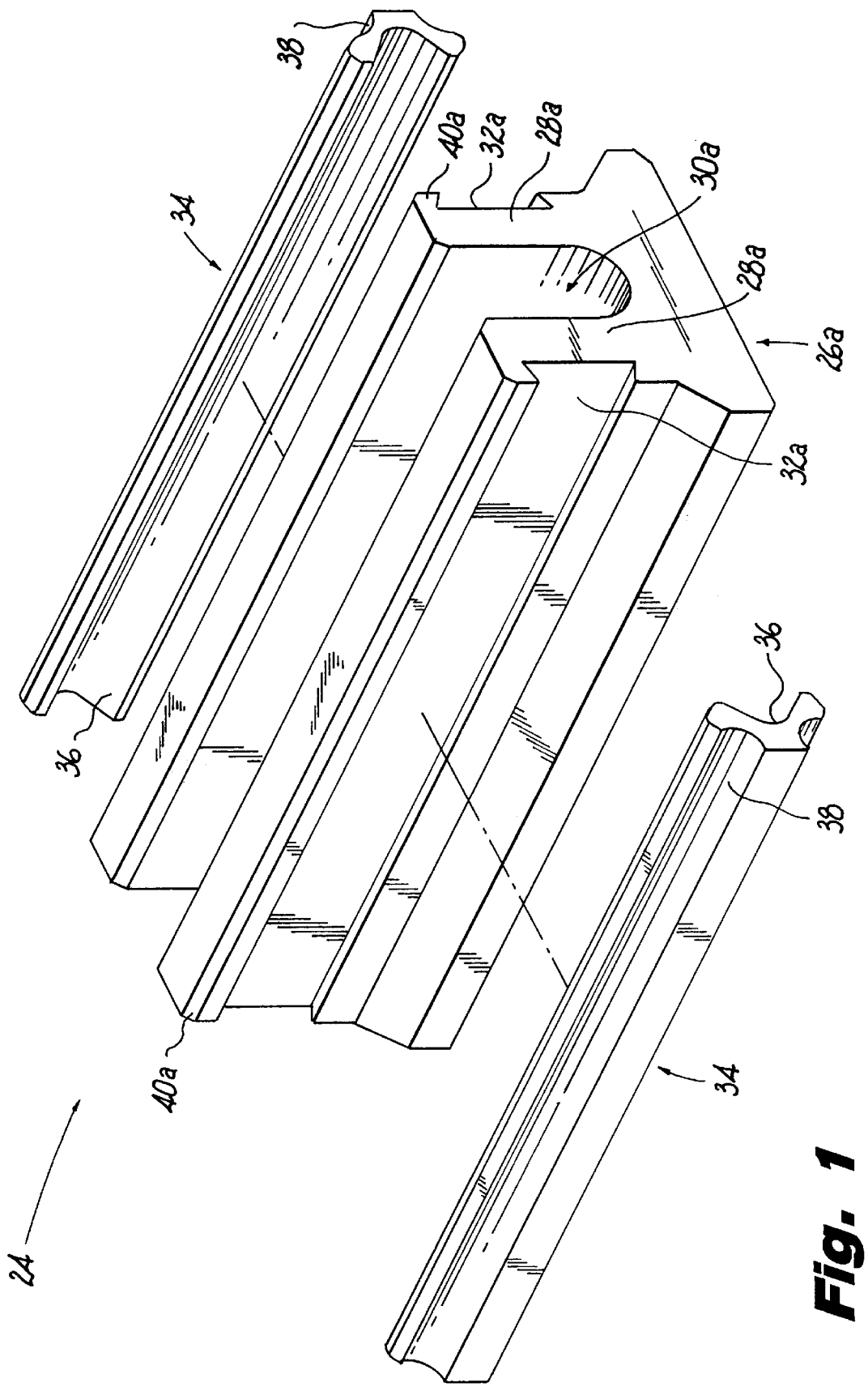
FIG. 1 is a perspective view with parts separated of a preferred embodiment of a rail for a linear motion bearing assembly fabricated in accordance with the present invention.

A method is provided herein for producing a rail for use in a linear motion bearing assembly. Referring now to the drawings in detail, and initially to FIG. 1, a preferred embodiment of the rail 24 made by the method disclosed herein includes a pair of load bearing inserts 34 and a substantially U-shaped base member 26a. The base member 26a is formed of a low cost material, such as a machine grade aluminum, and is preferably extruded using known manufacturing techniques. Other suitable manufacturing techniques such as, for example, a conventional milling method, are also available to fabricate the base member 26a. The base member 26a includes a pair of substantially vertical arms 28a that are parallel defining an axial groove 30a along the longitudinal length of the base member 26a This configuration provides an advantageous degree of flexibility to the vertical arms 28a with respect to the base member 26a.

Longitudinal grooves 32a may be formed in opposed sides of the vertical arms 28a substantially parallel to the axial groove 30a. The load bearing inserts 34 are configured and dimensioned to fit within the longitudinal grooves 32a and define a portion of load bearing tracks 38. The load bearing inserts 34 are produced from a high quality bearing steel using known techniques including, but not limited to cold drawing processes and subsequently cut to the desired length. The load bearing inserts 34 are hardened in line by known techniques such as, for example, induction heating and quenching.

Each of the load bearing inserts 34 is preferably formed with a longitudinal relief 36 on an inner surface thereof. This longitudinal relief 36 gives the load bearing insert 34 a degree of flexibility which enhances its final assembly to the rail. The load bearing inserts 34 preferably have a substantially uniform thickness in cross-section and include surfaces defining parallel load bearing tracks 38.

The load bearing inserts 34 are mountable to the base member 26a by configuring the relative dimensions of the longitudinal grooves 32a and the load bearing inserts 34 such that the load bearing inserts 34 fit into the longitudinal grooves 32a with some clearance. Optionally, the relative dimensions of the longitudinal grooves 32a and the load bearing inserts 34 may be configured such that the load bearing inserts 34 have to be flexed to fit into the longitudinal grooves 32a.

Figure 2:
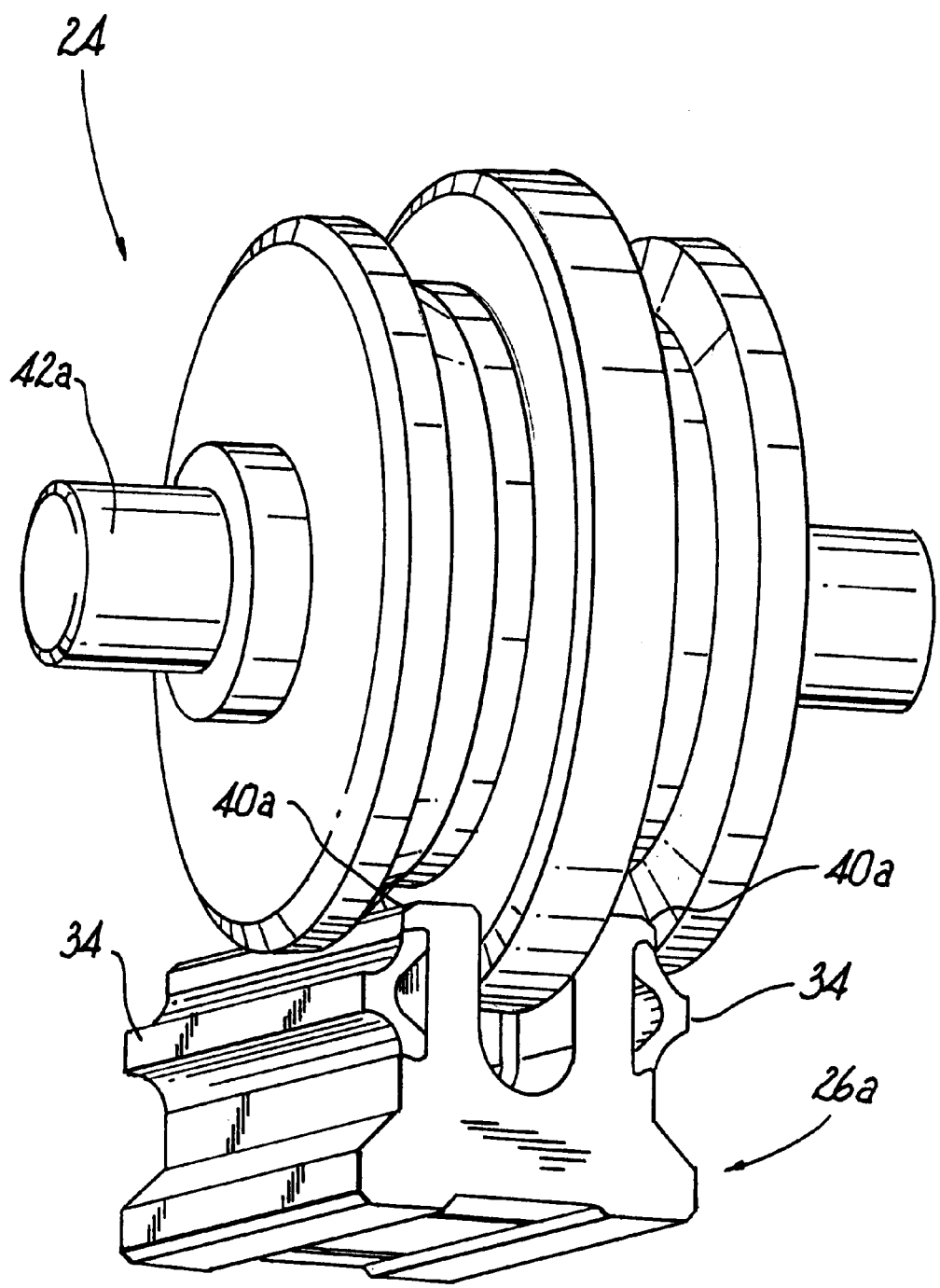
FIG. 2 is a perspective view of the rail of FIG. 1 being operated on by a crimping roller to secure the insert.

With reference to FIG. 2, the preferred crimping process in the current embodiment is presented. The load bearing inserts 34 are first inserted into the longitudinal grooves 32a of the base member 26a. The base member 26a acts as a support for the load bearing inserts 34 when a load is applied on the load bearing inserts 34. During the crimping process, a crimping roller 42a engages the rail 24 crimping the upper flanges 40a on each side of the base member 26a simultaneously. The load bearing inserts 34 may also be temporarily or permanently deformed during crimping In this embodiment, when the crimping roller 42a has passed a given section of the base member 26a, the load bearing inserts 34 spring back, leaving the load bearing inserts 34 in compression within the base member 26a. Alternatively, the crimping of the rail 26a may be accomplished by a sequential operation where each of upper flanges 40a are individually or sequentially crimped. As yet a further alternative, the crimping of rail 24 may be accomplished by a manual operation with hammering tools.

Figure 3A:
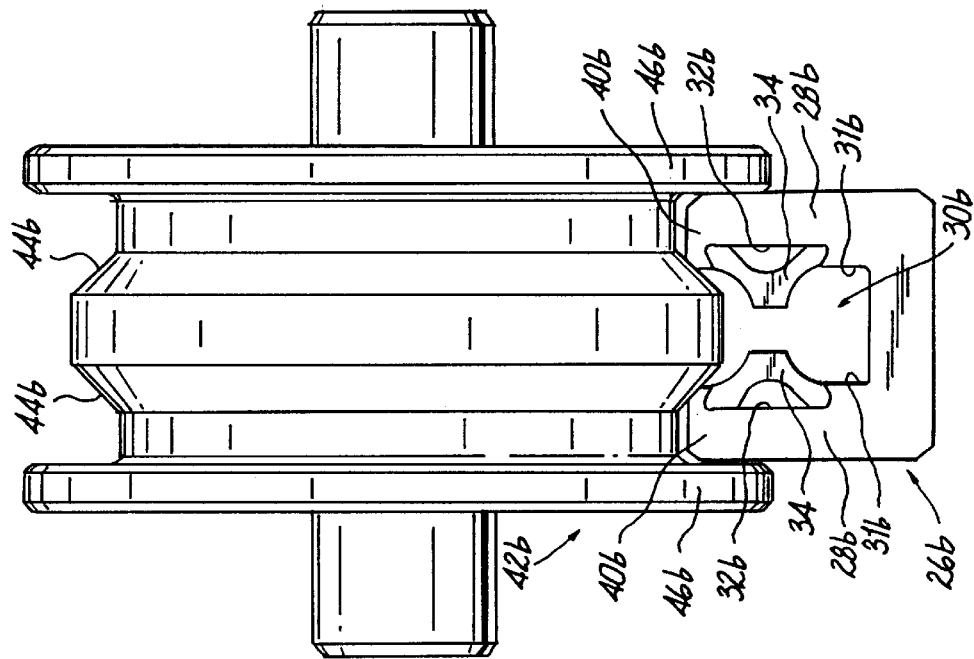
FIG. 3a is an end view of the rail of FIG. 1 being crimped.

FIG. 3a is an end view of the crimping roller 42a and the base member 26a in the crimping process where the load bearing inserts 34 are secured into the base member 26a. As may be seen, the crimping roller 42a is constructed to contact the base member 26a along the upper flanges 40a. The crimping roller 42a is additionally constructed with crimping surfaces 44a that control the deformation of the upper flanges 40a. The crimping roller 42a further has a center tongue 46a, that guides the crimping roller 42a along the base member 26a and ensures that the roll pattern is balanced. During operation of the crimping roller 42a, the crimping surfaces 44a crimp upper flanges 40a on each outer surface 31a of the arm 28a simultaneously. Because of the low hardness and good formability of the extruded aluminum base member, it may be deformed, within limits, to take on a new shape. In some instances, the deformation may be supplemented by, for example, the spring back action of the insert. This provides a robust connection between the components to guarantee good engagement between the components where the base member 26a is subject to elastic movement after the load has been removed.

Figure 3B:
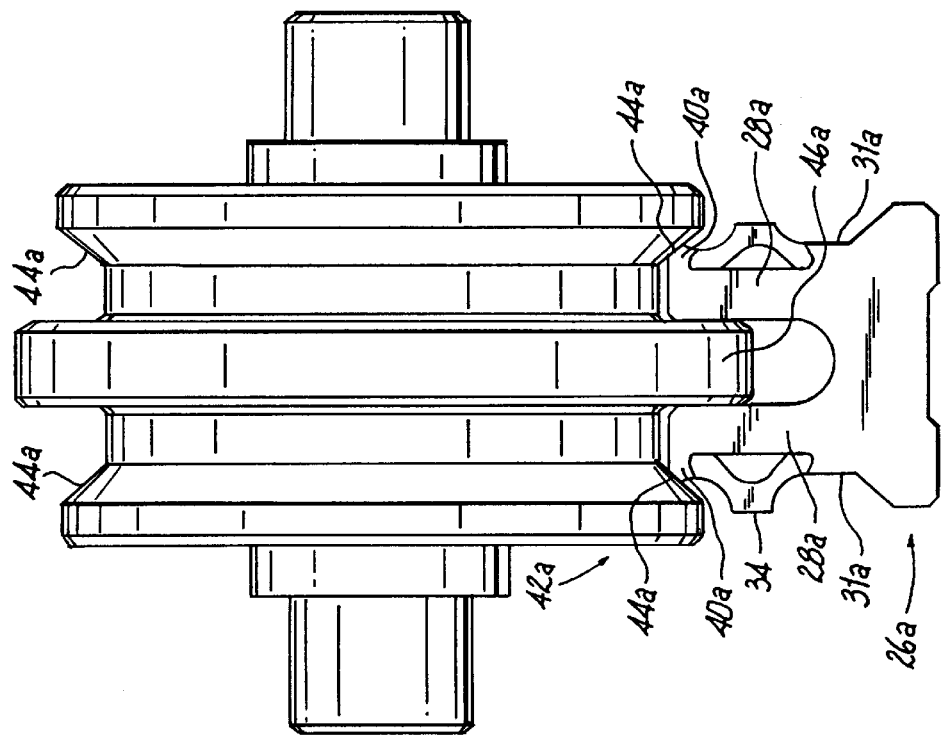
FIG. 3b an end view of an alternate embodiment of the rail of FIG. 1 being crimped in accordance with the present invention.

FIG. 3b is an end view of a crimping roller 42b configured for use with an alternate embodiment of the base member 26a. In this embodiment, a base member 26b includes a pair of substantially upright arms 28b extending from the base member 26b and defining an axial groove 30b therebetween. The inner surface 31b of each arm 28b is provided with a load bearing insert receiving groove 32b defining an upper flange 40b. Arms 28b are preferably flexible with respect to the base member 26b.

In operation, the crimping roller 42b contacts the base member 26b along the upper flanges 40b. The crimping roller 42b includes crimping surfaces 44b that deform the upper flanges 40b. The crimping roller 42b also has a pair of extended walls 46b, which guide the crimping roller 42b along the arms 28b and ensure that the roll pattern is balanced. During a typical crimping operation, the crimping surfaces 44b crimp upper flanges 40b on each inner surface 31b of the arm 28b simultaneously. As in the base member 26a of FIG. 1, the deformation of the base member 26b may be supplemented by, for example, the spring back action of the insert.

FIG. 4 is an end view of the load bearing insert 34, and demonstrates the mechanics of elastic deformation of the load bearing insert 34. The load bearing insert 34 may be shaped in a spring form to allow both spring action and support of a bearing load because of the hardness inherently required in the load bearing insert 34. As may be seen by comparison of the undeformed shape in solid line to the deformed shape in phantom, the part is free to spring along a horizontal axis by virtue of the shape and design of the longitudinal relief 36. This is the reaction that occurs as a result of the load bearing insert 34 flexing while being inserting into the longitudinal groove 32a of the base member 26a or by the crimping roller 42a applying load through the base member 26.

FIGS. 5 and 6 are provided to further demonstrate the deformation of the vertical arm 28a, and more specifically the upper flange 40a in the crimping step. Only one vertical arm 28a is shown for clarity. Before the crimping process, as seen in FIG. 5, the upper flange 40a is constructed such that there is clearance between the load bearing insert 34 and the upper flange 40a. During the crimping process, the upper flange 40a is permanently plastically deformed to engage the load bearing insert 34. The arrows in FIG. 5 indicate the approximate direction of material flow. Again, the spring-back effect of the upper flange 40a is compensated for by the spring expansion of the load bearing insert 34. After the rolling process, the upper flange 40a has been permanently deformed downwards, and the load bearing insert 34 has been securely fastened into the vertical arm 28a as shown in FIG. 6.

Figure 7:
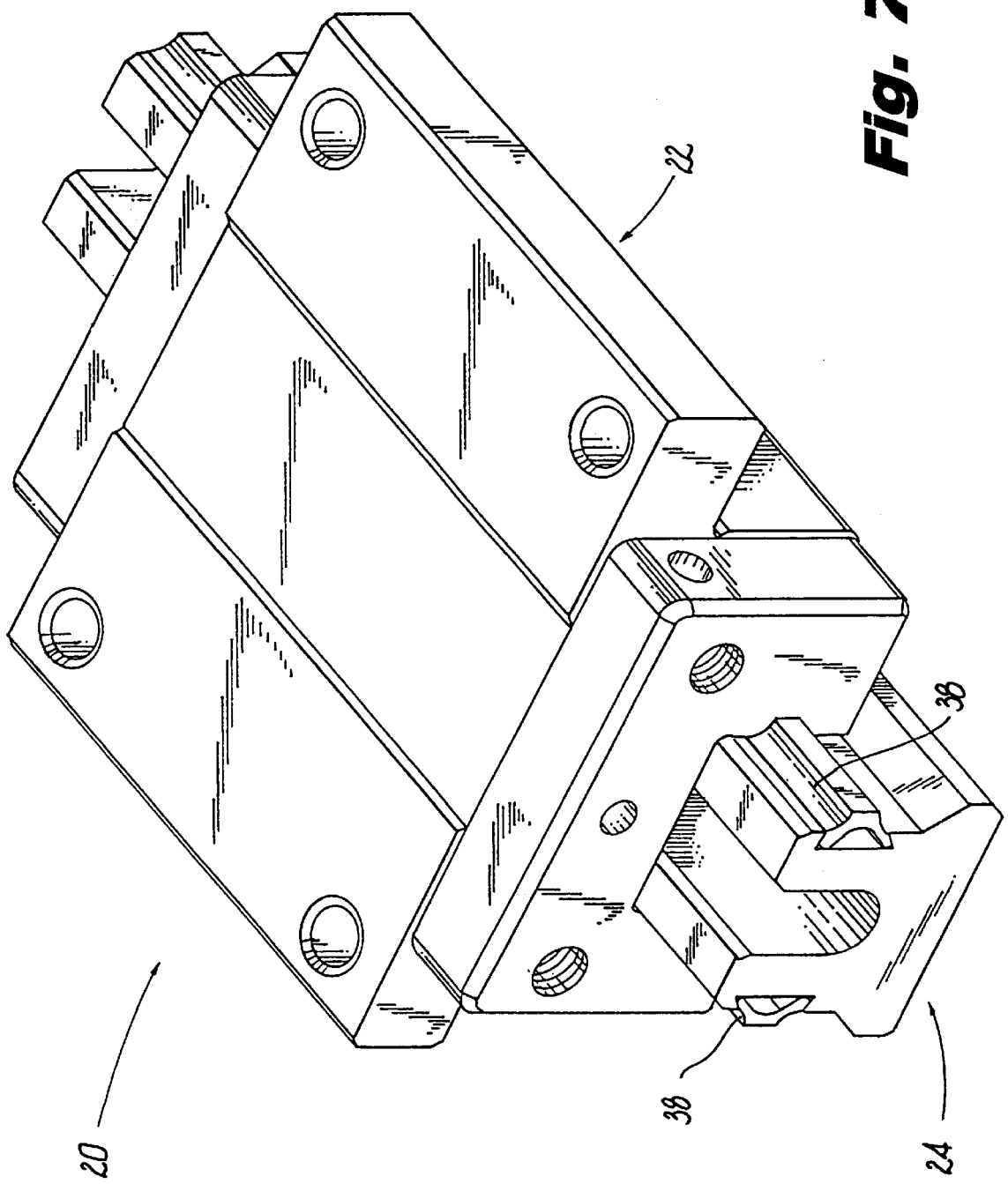
FIG. 7 is a perspective view of the assembled linear motion bearing assembly including the rail of FIG. 1.

Referring to FIG. 7, a fully assembled linear motion bearing assembly 20 in accordance with the present invention is shown. The assembly includes an inverted substantially U-shaped bearing carriage 22 configured and dimensioned to move along the rail 24 on load bearing tracks 38.

The present embodiment shows the manufacture of a linear motion bearing assembly through the continuous rolling technique described above. Similar effects may be obtained through deforming the entire structure in a single application of load, or through intermittent applications of load at given linear frequencies down the length of base member 26*a*. Likewise, the bearing carriage 22 may be assembled in like manner.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A method of forming a rail for use in a linear motion bearing assembly comprising the steps of:

forming an elongate base member having an insert mounting portion, said insert mounting portion having respective surfaces with at least one longitudinal groove therein;

elastically deforming a load bearing insert without causing substantial plastic deformation to said load bearing insert at a location spaced from the base member, the load bearing insert having surfaces which define load bearing tacks;

inserting the elastically deformed load bearing insert into said at least one longitudinal groove; and allowing the elastically deformed load bearing insert to reform into contact with the insert mounting portion.

2. The method of forming a rail as in claim 1, further comprising the step of crimping a portion of said insert mounting portion to secure said load bearing insert.

3. The method of forming a rail as in claim 1, further comprising the step of undercutting said surfaces to define said at least one longitudinal groove.

4. A method of forming a rail for use in a linear motion bearing assembly comprising the steps of:

forming an elongate base member having a pair of substantially vertical arms, said vertical arms having respective surfaces with at least one longitudinal groove therein; and elastically deforming a load bearing insert at a location spaced from the base member and thereafter positioning the load bearing insert into said at least one longitudinal groove without causing substantial plastic deformation to said load bearing insert, wherein said load bearing insert includes surfaces defining load bearing tracks.

5. The method of forming a rail as in claim 4, further comprising the step of crimping a portion of said vertical arm adjacent said at least one longitudinal groove to secure said load bearing insert.

6. The method of forming a rail as in claim 4, further comprising the step of cold drawing said load bearing insert having at least one load bearing track thereon.

7. The method of forming a rail as in claim 4, wherein the forming step comprises the step of extruding said base member such that said vertical arms are flexible.

8. The method of forming a rail as in claim 4, further comprising the step of undercutting said surfaces of said vertical arms to define said at least one longitudinal groove and at least one upper flange.

9. A method of forming a rail for use in a linear motion bearing assembly comprising the steps of:

extruding an elongate base member having a pair of substantially vertical arms having respective outer surfaces with a pair of undercut longitudinal a grooves therein and a pair of upper flanges, said vertical arms being flexible with respect to said base member;

providing a pair of flexible load bearing inserts having outer and inner surfaces, said outer surfaces defining a plurality of parallel grooves to form load bearing tracks, said inner surfaces defining longitudinal reliefs to enhance flexibility;

flexing said load bearing inserts at a location spaced from said base member and thereafter fitting the flexed load bearing inserts into said undercut longitudinal grooves without causing substantial plastic deformation of said load bearing insert; and crimping said upper flanges to secure said load bearing inserts.

10. The method of forming a rail as in claim 9, wherein the crimping step includes crimping said pair of upper flanges simultaneously to secure said load bearing inserts.

11. A method of forming a rail for use in a linear motion bearing assembly comprising the steps of:

extruding an elongate base member having a pair of substantially vertical arms having respective inner surfaces with a pair of undercut longitudinal grooves therein and a pair of upper flanges, said vertical arms being flexible with respect to said base member;

providing a pair of flexible load bearing inserts having outer and inner surfaces, said outer surfaces defining a plurality of parallel grooves to form load bearing tracks, said inner surfaces defining longitudinal reliefs to enhance flexibility;

positioning said load bearing inserts in said undercut longitudinal grooves; and crimping said upper flanges to cause elastic deformation of the load bearing insert without causing substantial plastic deformation thereto to secure said load bearing inserts.

12. The method of forming a rail as in claim 11, wherein the crimping step includes crimping said pair of upper flanges simultaneously to secure said load bearing inserts.

13. A method of forming a rail for use in a linear motion bearing assembly comprising the steps of:

providing an elongate base member having a pair of spaced arms, each arm having a longitudinal groove formed therein and a pair of flanges;

providing a pair of load bearing inserts dimensioned and configured to be received in the longitudinal grooves, each bearing insert including a longitudinal concave surface formed on an inner side thereof and a load bearing track formed on the other side thereof;

positioning each load bearing insert in a respective longitudinal groove with the longitudinal concavity facing the arm of the base member and being spaced therefrom; and crimping said flanges to cause elastic deformation of the load bearing insert without causing substantial plastic deformation thereto to secure said load bearing inserts.

* * * * *